S. N. CAMP.
Cotton-Chopper.

No. 198,274.  Patented Dec. 18, 1877.

WITNESSES:
E. Wolff
J. H. Scarborough

INVENTOR:
S. N. Camp.
BY Munn & Co.
ATTORNEYS.

UNITED STATES PATENT OFFICE.

SAMPSON N. CAMP, OF FORKSVILLE, LOUISIANA.

IMPROVEMENT IN COTTON-CHOPPERS.

Specification forming part of Letters Patent No. 198,274, dated December 18, 1877; application filed October 16, 1877.

*To all whom it may concern:*

Figure 1:
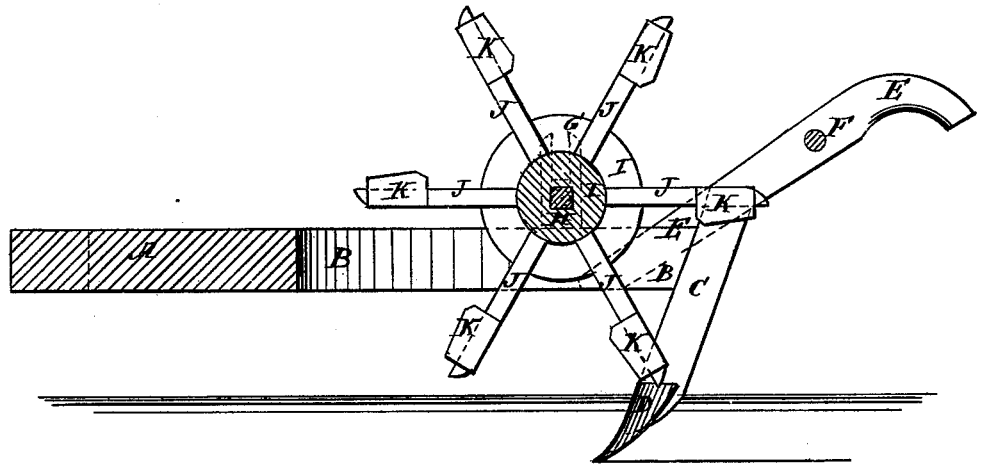
Figure 2:
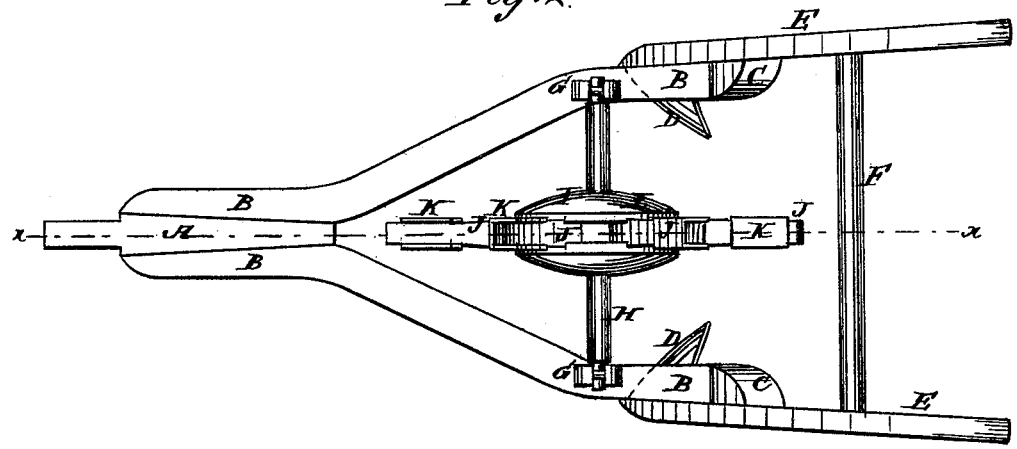

Be it known that I, SAMPSON NEWTON CAMP, of Forksville, in the parish of Ouachita and State of Louisiana, have invented a new and useful Improvement in Cotton-Choppers, of which the following is a specification:

Figure 1 is a vertical longitudinal section of my improved machine, taken through the line $x\ x$, Fig. 2. Fig. 2 is a top view of the same.

Similar letters of reference indicate corresponding parts.

The object of this invention is to furnish an improved machine for chopping or thinning cotton to a stand, which shall be simple in construction, inexpensive in manufacture, and effective and reliable in use, doing its work rapidly and well.

The invention consists in the combination of the slotted uprights, the axle, the flanged hub, the spokes or arms, and the cups with the frame and the standards and plows, as hereinafter fully described.

A is the draw-bar, to the opposite sides of the rear part of which are secured the forward ends of two beams, B. The beams B are inclined outward, and then project to the rearward, their rear parts being parallel.

To the rear ends of the beams B are attached the standards C, to the lower ends of which are attached the plows D. The plows D are made with sharp forwardly-curved points, and with wings or mold-boards upon their inner sides.

E E are the handles, which are attached to the beams B, and the upwardly-projecting ends of the standards C, and their upper parts are connected by a round, F. To the beams B, at their rear bends, are attached the lower ends of two uprights, G, which are slotted from their upper ends, to receive the journals of the axle H. To the center of the axle H is attached the hub I, which is made with two flanges, forming a deep groove around its center, to receive the inner ends of the spokes or arms J. The inner ends of the spokes or arms J are bolted to and between the flanges of the hub I, so that the said spokes or arms may be placed wider apart or closer together, according as the bunches of plants are to be wider apart or closer together.

The outer ends of the spokes or arms F are rounded or beveled upon the rear sides, and to said spokes or arms, near their outer ends, are attached U-shaped plates K, the sides of which project upon the forward sides of said spokes or arms, forming grooves, cavities, or cups of sufficient size to cover the plants that are to be left for a stand, and protect them from the soil thrown by the plows D, while the other plants and all the grass will be covered by said soil. As the cups K are withdrawn from the plants the soil held back by the said cups will crumble in between and around the stems of the plants, to support the plants and cover any grass that may be growing between them.

The journals of the axle H are kept in place in the slots of the uprights G by pins passed through said uprights G, which pins may also be used for supporting the said axle H at any desired distance from the ground.

Having thus described my invention, I claim as new and desire to secure by Letters Patent—

The combination of the slotted uprights G, the axle H, the flanged hub I, the spokes or arms J, and the cups K with the frame A B E F and the standards and plows C D, substantially as herein shown and described.

SAMPSON NEWTON CAMP.

Witnesses:
A. W. SHEPPARD,
R. L. BROOKS.